(12) United States Patent
Hsu et al.

(10) Patent No.: US 12,284,552 B2
(45) Date of Patent: Apr. 22, 2025

(54) METHOD OF TRAFFIC FLOW MANAGEMENT IN WIRELESS COMMUNICATIONS SYSTEM WITH STREAM CLASSIFICATION SERVICE, AND ASSOCIATED APPARATUS

(71) Applicant: MEDIATEK INC., Hsin-Chu (TW)

(72) Inventors: Chien-Fang Hsu, Hsinchu (TW); Gabor Bajko, San Jose, CA (US)

(73) Assignee: MEDIATEK INC., Hsinchu (TW)

( * ) Notice: Subject to any disclaimer, the term of this patent is extended or adjusted under 35 U.S.C. 154(b) by 292 days.

(21) Appl. No.: 17/868,718

(22) Filed: Jul. 19, 2022

(65) Prior Publication Data

US 2023/0047109 A1 Feb. 16, 2023

Related U.S. Application Data

(60) Provisional application No. 63/232,706, filed on Aug. 13, 2021.

(51) Int. Cl.
*H04W 28/08* (2023.01)
*H04L 47/2441* (2022.01)
*H04W 28/12* (2009.01)

(52) U.S. Cl.
CPC ..... *H04W 28/0992* (2020.05); *H04L 47/2441* (2013.01); *H04W 28/12* (2013.01)

(58) Field of Classification Search
CPC . H04W 28/0992; H04W 28/12; H04W 28/02; H04W 48/16; H04L 47/2441; H04L 47/24; H04L 1/08; G06F 18/214
See application file for complete search history.

(56) References Cited

U.S. PATENT DOCUMENTS

2018/0139097 A1* 5/2018 Jhu .......................... H04L 41/12
2021/0329500 A1* 10/2021 Cariou ................ H04W 74/002
(Continued)

FOREIGN PATENT DOCUMENTS

CN 111416874 A * 7/2020 ......... H04L 65/1066
CN 114938340 A * 8/2022 ........... H04L 43/062
(Continued)

OTHER PUBLICATIONS

Dave Cavalcanti et al., Intel Corporation, "Enhancements for QoS and low latency in 802.11be R1", IEEE 802.11-20/1350r7, Aug. 2020, from the Internet URL: https://mentor.ieee.org/802.11/dcn/20/11-20-1350-07-00be-enhancements-for-qos-and-low-latency-in-802-11be-r1.pptx, pp. 1-16, Jan. 11, 2021.
(Continued)

*Primary Examiner* — Phirin Sam
*Assistant Examiner* — Louis Samara
(74) *Attorney, Agent, or Firm* — Winston Hsu

(57) ABSTRACT

A method of traffic flow management with stream classification service (SCS) and associated apparatus are provided, where the wireless communications system may include a first device and a second device. The method may include: carrying and sending a first descriptor element in a first request frame, requesting for a SCS stream from the first device, wherein the first descriptor element is related to the SCS, wherein the first request frame includes a first indication, indicating whether the second device agrees that the SCS stream and any other stream from the first device to the second device share a same traffic identifier (TID).

25 Claims, 10 Drawing Sheets

(56) References Cited

U.S. PATENT DOCUMENTS

| | | | |
|---|---|---|---|
| 2022/0350683 A1* | 11/2022 | Surendran | G06F 18/214 |
| 2023/0199546 A1* | 6/2023 | Canpolat | H04L 1/08 |
| | | | 370/329 |
| 2023/0370533 A1* | 11/2023 | Huang | H04W 24/02 |
| 2024/0098624 A1* | 3/2024 | Patil | H04W 48/16 |

FOREIGN PATENT DOCUMENTS

| | | | |
|---|---|---|---|
| KR | 20190142365 A | * 12/2019 | |
| WO | 2021/080264 A1 | 4/2021 | |
| WO | WO-2022258821 A1 | * 12/2022 | H04L 47/24 |

OTHER PUBLICATIONS

Dibakar Das et al., Intel, "CR for CID 1977", IEEE 802.11-21/0340r0, Feb. 2021, from the Internet URL: https://mentor.ieee.org/802.11/dcn/21/11-21-0340-00-00be-cr-for-cid-1977.docx, XP068179442, Feb. 28, 2021.

Guogang Huang et al., Huawei, "Proposed Draft Text for Transmit Stream/Category Measurement", IEEE 802.11-21/0877r0, Jan. 2021, from the Internet URL: https://mentor.ieee.org/802.11/ dcn/21/11-21-0877-00-00be-proposed-draft-text-for-transmit-stream-category-measurement.docx, XP068181906, May 20, 2021.

Osama Aboul-Magd, Huawei Techonologies, "Proposed Resolutions to CIDs 4145, 4146, and 4147", IEEE 802.11-20/0814r4, May 2020, from the Internet URL: https://mentor.ieee.org/802.11/dcn/20/11-20-0814-04-000m-proposed-resolutions-to-cids-4145-4146-and-4147.docx, XP068170393, Aug. 4, 2020.

* cited by examiner

Predetermined location,
e.g., in any of TSPEC element, subsequent element, and frame body

| Element ID | Length | SCSID | Request type | . . . . . . | TSPEC element<br>INFO_PREF | Optional subelements |
|---|---|---|---|---|---|---|
| 1 | 1 | 1 | 1 | | 57 | variable |

Octets:

FIG. 6

| Element ID | Length | SCSID | Request type | ... | TSPEC element (optional) | Subsequent element INFO_PREF |
|---|---|---|---|---|---|---|
| 1 | 1 | 1 | 1 | | 0 or 57 | variable |

Octets:

FIG. 7

METHOD OF TRAFFIC FLOW MANAGEMENT IN WIRELESS COMMUNICATIONS SYSTEM WITH STREAM CLASSIFICATION SERVICE, AND ASSOCIATED APPARATUS

CROSS REFERENCE TO RELATED APPLICATIONS

This application claims the benefit of U.S. Provisional Application No. 63/232,706, filed on Aug. 13, 2021. The content of the application is incorporated herein by reference.

BACKGROUND

The present invention is related to communications control, and more particularly, to a method of traffic flow management in a wireless communications system with stream classification service (SCS), and associated apparatus such as an access point (AP) device and a station (STA) device.

According to the related art, on the AP side, if there are multiple SCS streams that are mapped to the same traffic identifier (TID), or there are other non-SCS streams mapped to the same TID, a receiving STA cannot identify which medium access control (MAC) service data unit (MSDU) is a part of an SCS stream with quality of service (QoS) requirements so that they cannot be processed with corresponding receiving policies. Thus, a novel method and associated architecture are needed for solving the problems of the related art without introducing any side effect or in a way that is less likely to introduce a side effect.

SUMMARY

It is an objective of the present invention to provide a method of traffic flow management in a wireless communications system with stream classification service (SCS), and associated apparatus such as an access point (AP) device and a station (STA) device, in order to solve the above-mentioned problems.

At least one embodiment of the present invention provides a method of traffic flow management in a wireless communications system with SCS, where the wireless communications system comprises a first device (e.g., the AP device) and a second device (e.g., the STA device), and the method is applicable to the second device. For example, the method may comprise: carrying and sending a first descriptor element in a first request frame, requesting for a SCS stream from the first device, wherein the first descriptor element is related to the SCS, wherein the first request frame comprises a first indication, indicating whether the second device agrees that the SCS stream and any other stream from the first device to the second device share a same traffic identifier (TID).

In addition to the method mentioned above, the present invention further provides a second device (e.g., the STA device) for performing traffic flow management in a wireless communications system with SCS, where the wireless communications system comprises a first device (e.g., the AP device) and the second device (e.g., the STA device). The second device may comprise a processing circuit, and at least one communications control circuit that is coupled to the processing circuit. The processing circuit may be arranged to control operations of the second device, and the at least one communications control circuit may be arranged to perform communications control, and more particularly, perform wireless communications operations with the first device for the second device. For example, the second device is arranged to carry and send a first descriptor element in a first request frame, requesting for a SCS stream from the first device, wherein the first descriptor element is related to the SCS, wherein the first request frame comprises a first indication, indicating whether the second device agrees that the SCS stream and any other stream from the first device to the second device share a same traffic identifier (TID).

At least one embodiment of the present invention provides a method of traffic flow management in a wireless communications system with SCS, where the wireless communications system comprises a first device (e.g., the AP device) and a second device (e.g., the STA device), and the method is applicable to the first device. For example, the method may comprise: receiving a first request frame carrying a first descriptor element from the second device, the first descriptor element requesting for a SCS stream from the first device, wherein the first descriptor element is related to the SCS, the first request frame comprises a first indication, indicating whether the second device agrees that the SCS stream and any other stream from the first device to the second device share a same traffic identifier (TID); and in response to the first request frame, sending a first response frame to the second device, for indicating whether the first device accepts the request on the SCS stream. According to some embodiment, the present invention further provides the first device that operates according to the method mentioned above.

It is an advantage of the present invention that, through proper design, the present invention method, as well as the associated apparatus such as the first device (e.g., the AP device) and the second device (e.g., the STA device), can enhance the overall performance of the wireless communications system. For example, the receiving STA such as the STA device can send preference information such as the first indication to the AP device in advance (e.g., during the SCS negotiation), for indicating whether the STA device agrees that the SCS stream and the aforementioned any other stream from the AP device to the STA device share the same TID. For example, the first indication may indicate an additional request (which differs from the aforementioned at least one request) that the SCS stream and the aforementioned any other stream from the AP device to the STA device should not share the same TID. On the AP side such as the AP device, if there are multiple SCS streams, or there are one or more other streams such as one or more non-SCS streams, the AP device can selectively accept or decline the additional request indicated by the preference information such as the first indication. In a situation where the additional request comprises the SCS stream and the aforementioned any other stream from the AP device to the STA device being not assigned to the same TID, the AP device can prevent mapping or assigning the SCS stream and the aforementioned any other stream (e.g., another SCS stream among the multiple SCS streams, or any non-SCS stream among the one or more non-SCS streams) to the same TID. Therefore, the present invention method can guarantee that the receiving STA such as the STA device can process a data unit (e.g., MSDU), such as a part of an SCS stream with certain requirements (e.g., QoS requirements), with corresponding receiving policies. In addition, the present invention method and apparatus can solve the related art problems without introducing any side effect or in a way that is less likely to introduce a side effect.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 6 is a diagram illustrating the predetermined location involved with the preference information control scheme shown in FIG. 5 according to an embodiment of the present invention.

FIG. 7 is a diagram illustrating the predetermined location involved with the preference information control scheme shown in FIG. 5 according to another embodiment of the present invention.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
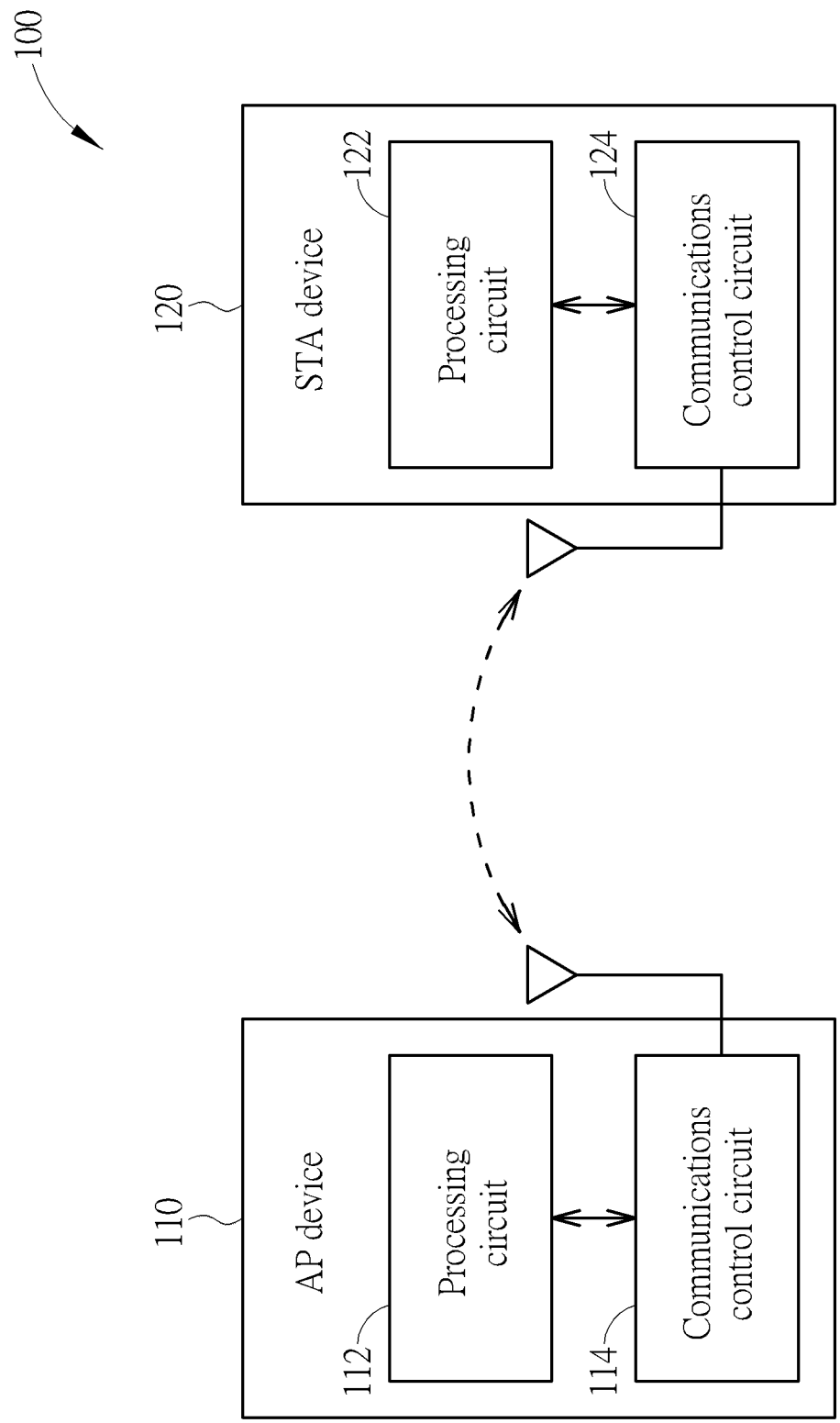
FIG. 1 is a diagram of a wireless communications system according to an embodiment of the present invention.

FIG. 1 is a diagram of a wireless communications system 100 according to an embodiment of the present invention. For better comprehension, the wireless communications system 100 (e.g., any device therein) may be compatible or back-compatible to one or more versions of the Institute of Electrical and Electronics Engineers (IEEE) 802.11 standards, but the present invention is not limited thereto. As shown in FIG. 1, the wireless communications system 100 may comprise multiple devices, for example, a first device such as the AP device 110 and a second device such as the STA device 120, where the AP device 110 may comprise a processing circuit 112, at least one communications control circuit (e.g., one or more communications control circuits), which may be collectively referred to as the communications control circuit 114, and at least one antenna (e.g., one or more antennas) of the communications control circuit 114, and the STA device 120 may comprise a processing circuit 122, at least one communications control circuit (e.g., one or more communications control circuits), which may be collectively referred to as the communications control circuit 124, and at least one antenna (e.g., one or more antennas) of the communications control circuit 124.

The processing circuit 112 can be arranged to control operations of the AP device 110 to make the AP device 110 act as an AP in the wireless communications system 100, and the communications control circuit 114 can be arranged to perform communications control, and more particularly, perform wireless communications operations with the STA device 120 (e.g., the communications control circuit 124 thereof) for the AP device 110. In addition, the processing circuit 122 can be arranged to control operations of the STA device 120 to make the STA device 120 act as an STA in the wireless communications system 100, and the communications control circuit 124 can be arranged to perform communications control, and more particularly, perform wireless communications operations with the AP device 110 (e.g., the communications control circuit 114 thereof) for the STA device 120.

According to some embodiments, the processing circuit 112 can be implemented by way of at least one processor/microprocessor, at least one random access memory (RAM), at least one bus, etc., and the communications control circuit 114 can be implemented by way of at least one wireless network control circuit and at least one wired network control circuit, but the present invention is not limited thereto. In addition, the processing circuit 122 can be implemented by way of at least one processor/microprocessor, at least one RAM, at least one bus, etc., and the communications control circuit 124 can be implemented by way of at least one wireless network control circuit, but the present invention is not limited thereto.

Figure 2:
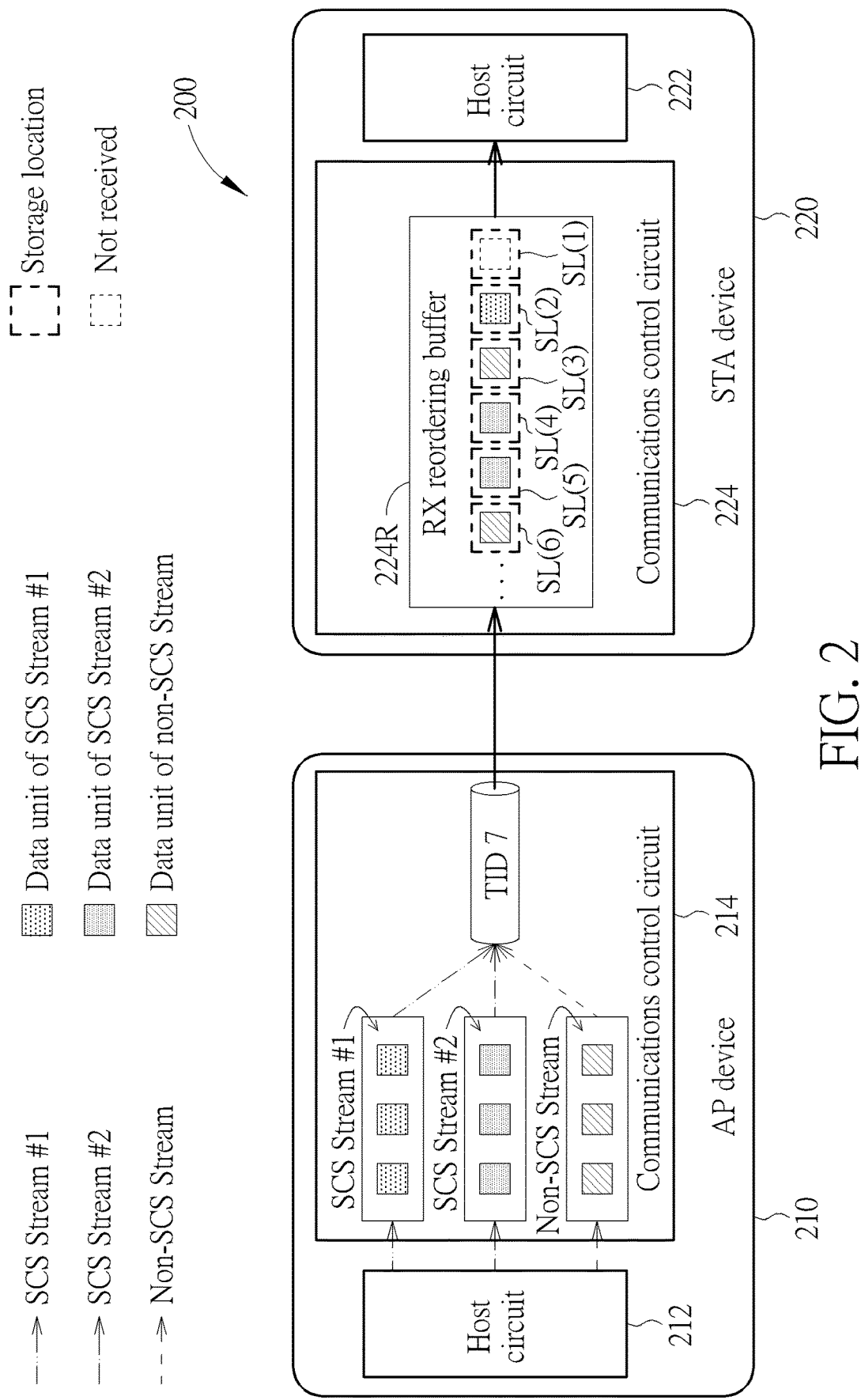
FIG. 2 is a diagram illustrating a first control scheme according to an embodiment of the present invention.

FIG. 2 is a diagram illustrating a first control scheme according to an embodiment of the present invention. A wireless communications system 200 may comprise an AP device 210 acting as an AP in the wireless communications system 200, and may further comprise an STA device 220 acting as an STA in the wireless communications system 200. The AP device 210 may comprise a host circuit 212 (e.g., at least one processor/microprocessor running program codes for controlling the AP) acting as a host in the AP device 210 and further comprise at least one communications control circuit (e.g., one or more communications control circuits) such as the communications control circuit 214, etc., and the STA device 220 may comprise a host circuit 222 (e.g., at least one processor/microprocessor running program codes for controlling the STA) acting as a host in the STA device 220 and further comprise at least one communications control circuit (e.g., one or more communications control circuits) such as the communications control circuit 224, etc. In addition, the AP device 210 (e.g., the communications control circuit 214 therein) and the STA device 220 (e.g., the communications control circuit 224 therein) can communicate with each other according to the IEEE 802.11 protocol. The AP device 210 and the STA device 220 shown in FIG. 2 can be taken as examples of the AP device 110 and the STA device 120 shown in FIG. 1, respectively, where the host circuit 212 and the communications control circuit 214 can be taken as examples of the processing circuit 112 and the communications control circuit 114, respectively, and the host circuit 222 and the communications control circuit 224 can be taken as examples of the processing circuit 122 and the communications control circuit 124, respectively. According to some viewpoints, the host circuits 212 and 222 can be regarded as the upper layers of the AP device 210 and the STA device 220, respectively, and the communications control circuits 214 and 224 can be regarded as the lower layers of the AP device 210 and the STA device 220, respectively, where the wireless communications system 200 comprising the AP device 210 and the STA device 220 can be regarded as a local area network (LAN), but the present invention is not limited thereto.

The data being transmitted from the AP device 210 to the STA device 220, such as the data being transmitted from the host circuit 212 to the host circuit 222 through the communications control circuits 214 and 224, may be obtained from at least one network (e.g., one or more networks) such as the Internet through wired or wireless connections, and more particularly, may comprise a first stream such as an SCS stream #1, and may further comprise at least one other stream (e.g., one or more other streams), where the aforementioned at least one other stream may comprise one or a combination of at least one non-SCS stream and at least one other SCS stream (e.g., one or more non-SCS streams and/or one or more other SCS streams). For better comprehension, the aforementioned at least one other stream may be illustrated as a second stream such as an SCS stream #2, and another stream such as a non-SCS stream (e.g., unclassified data), but the present invention is not limited thereto. According to some embodiments, the streams under discussion (e.g., the first stream such as the SCS stream #1, the second stream such as the SCS stream #2, and the other stream such as the non-SCS stream as shown in FIG. 2) among the data being transmitted from the AP device 210 to the STA device 220 may vary, and the implementation of the present invention will not be hindered. For example, in a first case, the streams among the data being transmitted from the AP device 210 to the STA device 220 may comprise the first stream such as the SCS stream #1 and the other stream such as the non-SCS stream, without the second stream such as the SCS stream #2. For another example, in a second case, the streams among the data being transmitted from the AP device 210 to the STA device 220 may comprise the second stream such as the SCS stream #2 and the other stream such as the non-SCS stream, without the first stream such as the SCS stream #1. For yet another example, in a third case, the streams among the data being transmitted from the AP device 210 to the STA device 220 may comprise the first stream such as the SCS stream #1 and the second stream such as the SCS stream #2, without the other stream such as the non-SCS stream.

According to this embodiment, the original case that the streams among the data being transmitted from the AP device 210 to the STA device 220 comprise the first stream such as the SCS stream #1, the second stream such as the SCS stream #2, and the other stream such as the non-SCS stream can be taken as an example for better comprehension. At the AP side such as the AP device 210, the host circuit 212 can be arranged to prepare the first stream such as the SCS stream #1, the second stream such as the SCS stream #2, and the other stream such as the non-SCS stream, and more particularly, prepare respective data units of the first stream (e.g., the SCS stream #1), the second stream (e.g., the SCS stream #2), and the other stream (e.g., the non-SCS stream).

In addition, the communications control circuit 214 can be arranged to map or assign the first stream such as the SCS stream #1, the second stream such as the SCS stream #2, and the other stream such as the non-SC S stream to a same traffic identifier (TID) to allow the first stream such as the SCS stream #1, the second stream such as the SCS stream #2, and the other stream such as the non-SCS stream to share the same TID, and combine the respective data units of the first stream (e.g., the SCS stream #1), the second stream (e.g., the SCS stream #2), and the other stream (e.g., the non-SCS stream) into a plurality of data units with a predetermined order, such as a series of data units having a series of serial numbers, respectively, for being sent to the STA side such as the STA device 220. For example, the aforementioned same TID can be a certain TID among a plurality of predetermined TIDs, such as one of the TIDs as defined in the one or more versions of the IEEE 802.11 standards, and more particularly, can be equal to seven (labeled "TID 7" for better comprehension), but the present invention is not limited thereto. In some examples, the aforementioned same TID can be any TID among the plurality of predetermined TIDs, and more particularly, can be equal to any value selected from the values $\{0, 1, 2, 3, 4, 5, 6, 7\}$.

As shown in FIG. 2, the communications control circuit 224 at the STA side (e.g., the STA device 220) may comprise, on a receiving (RX) path thereof, a reordering buffer such as the RX reordering buffer 224R, where the RX reordering buffer 224R may comprise a plurality of storage locations (e.g. consecutive storage locations) such as a series of storage locations $\{SL(1), SL(2), SL(3), SL(4), SL(5), SL(6), \ldots\}$, for buffering received data units that are sent from the AP device 210, such as at least one portion (e.g., a portion or all) of the plurality of data units with the predetermined order (e.g., the series of data units having the series of serial numbers, respectively). As the plurality of data units may be received by the STA device 220 in another order (e.g., a random order that is typically different from the predetermined order) due to some reasons such as interference and retransmission, the STA device 220 can utilize the RX reordering buffer 224R to perform reordering operations on the received data units, and more particularly, buffer (or temporarily store) the received data units at the plurality of storage locations such as the series of storage locations $\{SL(1), SL(2), SL(3), SL(4), SL(5), SL(6), \ldots\}$ according to the respective serial numbers of the received data units, to make the received data units that have been buffered in the RX reordering buffer 224R conform to the predetermined order, where one or more data units among the plurality of data units, such as the data unit that is expected to be buffered at the storage location SL(1) according the serial number thereof, may have not been received and buffered in the RX reordering buffer 224R during the reordering operations (labeled "Not received" for brevity). As a result of performing the reordering operations, all of the plurality of data units may have been buffered in the RX reordering buffer 224R to conform to the predetermined order, and the communications control circuit 224 can perform a buffer flush operation, and more particularly, send or flush the plurality of data units conforming to the predetermined order from the RX reordering buffer 224R to the host circuit 222, for further processing in the host circuit 222.

According to some embodiments, the respective data units of the first stream (e.g., the SCS stream #1), the second stream (e.g., the SCS stream #2), and the other stream (e.g., the non-SCS stream) can be implemented by way of MSDUs, but the present invention is not limited thereto.

According to some embodiments, the respective data units of the first stream (e.g., the SCS stream #1), the second stream (e.g., the SCS stream #2), and the other stream (e.g., the non-SCS stream) can be implemented by way of MAC protocol data units (MSDUs). According to some embodiments, the respective data units of the first stream (e.g., the SCS stream #1), the second stream (e.g., the SCS stream #2), and the other stream (e.g., the non-SCS stream) can be implemented by way of one or a combination of MSDUs, MPDUs, and aggregate MSDUs (A-MSDUs).

According to some embodiments, the communications control circuit 214 at the AP side (e.g., the AP device 210) may comprise, on a transmitting (TX) path thereof, at least one TX buffer (e.g., one or more TX buffers). For example, at least one portion of the aforementioned at least one TX buffer on the TX path of the communications control circuit 214 can be arranged to prepare data units to be sent to the communications control circuit 224 at the STA side (e.g., the STA device 220). For brevity, similar descriptions for these embodiments are not repeated in detail here.

Figure 3:
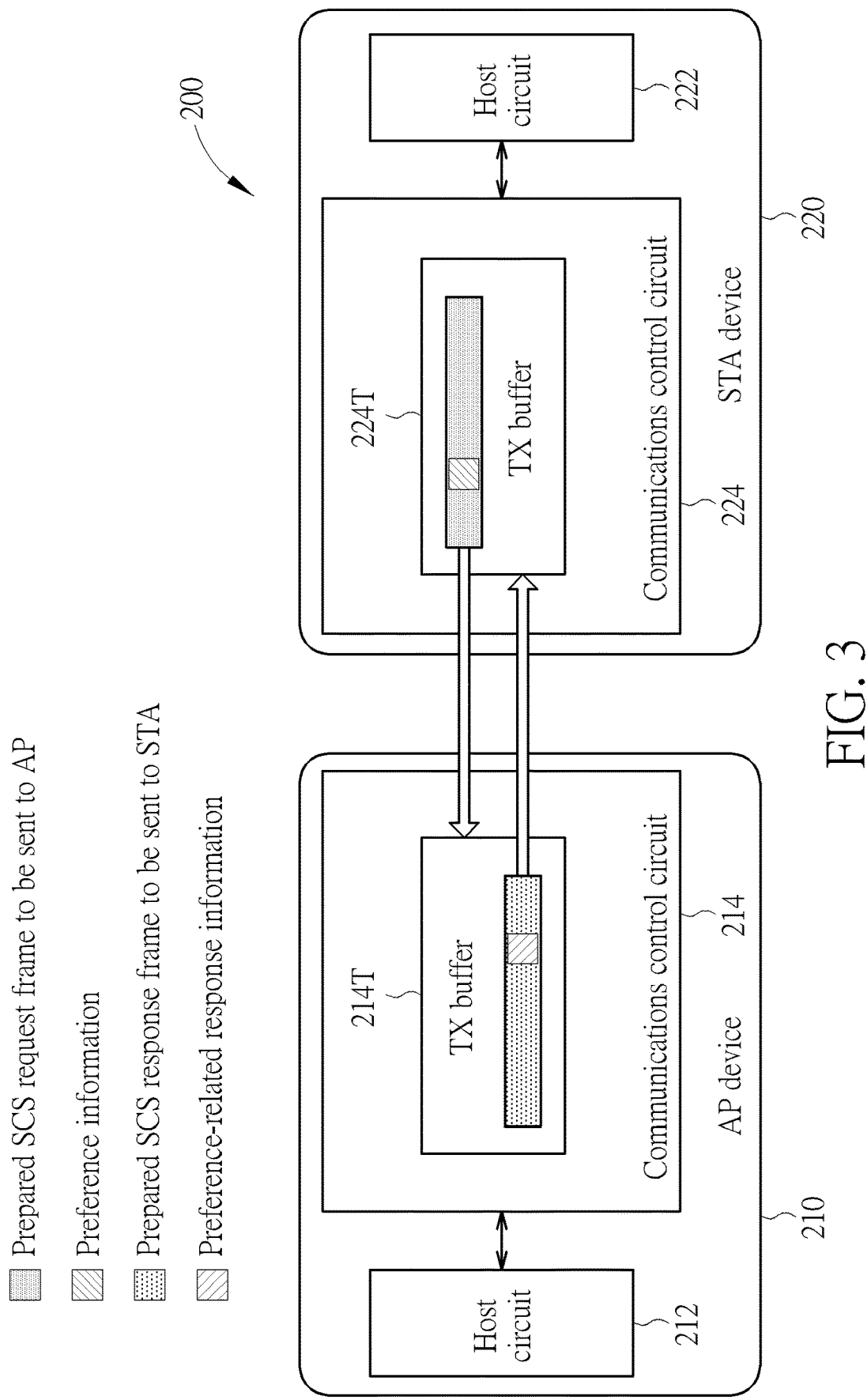
FIG. 3 is a diagram illustrating a preference-aware data processing control scheme of a method of traffic flow management in a wireless communications system with SCS according to an embodiment of the present invention.

FIG. 3 is a diagram illustrating a preference-aware data processing control scheme of a method of traffic flow management in a wireless communications system with SCS according to an embodiment of the present invention. For better comprehension, the communications control circuit 224 at the STA side (e.g., the STA device 220) may comprise, on a TX path thereof, a TX buffer 224T, for preparing a first request frame to be sent to the communications control circuit 214 at the AP side (e.g., the AP device 210), and the communications control circuit 214 at the AP side (e.g., the AP device 210) may comprise, on the TX path thereof, a TX buffer 214T, for preparing a first response frame to be sent to the communications control circuit 224 at the STA side (e.g., the STA device 220), where the aforementioned at least one TX buffer on the TX path of the communications control circuit 214 may comprise the TX buffer 214T, but the present invention is not limited thereto. According to some embodiments, the architecture of the AP device 210 (e.g., the communications control circuit 214) and/or the architecture of the STA device 220 (e.g., the communications control circuit 224) may vary.

For example, the associated operations regarding the STA side may comprise:

(1) the wireless communications system 200 can utilize the STA device 220 to prepare the first request frame (e.g., a first SCS request frame) in the TX buffer 214T to carry a first descriptor element (e.g., a first SCS descriptor element) in the first request frame (e.g., the first SCS request frame), for indicating at least one request (e.g., one or more requests) regarding the first stream (e.g., the SCS stream #1) from the AP device 210 to the STA device 220, for example, the first descriptor element (e.g., a first SCS descriptor element) in the first request frame (e.g., the first SCS request frame) may request for the SCS stream #1 from the AP device 210 to the STA device 220, wherein the first descriptor element is related to the SCS;

(2) the wireless communications system 200 can utilize the STA device 220 to send the first request frame carrying the first descriptor element (e.g., the first SCS request frame carrying the first SCS descriptor element) to the AP device 210, where the first request frame (e.g., the first SCS request frame) may comprise a first indication, indicating whether the STA device 220 agrees that the first stream (e.g., the SCS stream #1) and any other stream such as the aforementioned at least one other stream (e.g., the SCS stream #2 and the non-SCS stream) from the AP device 210 to the STA device 220 share a same TID, for example, the first indication may act as preference information (e.g., the information of the preference regarding whether the SCS stream #1 and the aforementioned any other stream can share the same TID); and (3) the wireless communications system 200 can utilize the STA device 220 to receive the first response frame (e.g., a first SCS response frame) from the AP device 210, such as the first response frame (e.g., the first SCS response frame) sent by the AP device 210 in response to the first request frame (e.g., the first SCS request frame), for indicating whether the AP device 210 accepts the request on the SCS stream #1;

wherein the first response frame may be arranged to indicate whether the AP device 210 accepts or declines the request on the first indication indicating that the STA device 220 disagrees on sharing the same TID with the aforementioned any other stream (e.g., an additional request that the SCS stream #1 and the aforementioned any other stream such as the SCS stream #2 and the non-SCS stream being not assigned to the same TID), while the first response frame may indicate that the AP device 210 accepts the request on the SCS stream #1, but the present invention is not limited thereto. As shown in the right half of FIG. 3, the first request frame (e.g., the first SCS request frame) can be prepared in the TX buffer 224T for being sent to the AP device 210 (labeled "Prepared SCS request frame to be sent to AP" for brevity), and the preference information such as the first indication can be embedded in the first request frame (e.g., the first SCS request frame), for example, at a predetermined location within the first request frame (e.g., the first SCS request frame). As a result, when sending the first request frame (e.g., the first SCS request frame) to the AP device 210, the STA device 220 can notify the AP device 210 of the preference indicated by the preference information such as the first indication.

In addition, the associated operations regarding the AP side may comprise:

(1) the wireless communications system 200 can utilize the AP device 210 to receive the first request frame carrying the first descriptor element (e.g., the first SCS request frame carrying the first SCS descriptor element) from the STA device 220, where the first descriptor element (e.g., the first SCS descriptor element) carried in the first request frame (e.g., the first SCS request frame) may request for the first stream (e.g., the SCS stream #1) from the AP device 210 to the STA device 220, wherein the first descriptor element is related to the SCS, and more particularly, the first request frame (e.g., the first SCS request frame) may comprise the first indication, and indicating whether the STA device 220 agrees that the first stream (e.g., the SCS stream #1) and the aforementioned any other stream such as the aforementioned at least one other stream (e.g., the SCS stream #2 and the non-SCS stream) from the AP device 210 to the STA device 220 share the same TID; and (2) in response to the first request frame (e.g., the first SCS request frame), the wireless communications system 200 can utilize the AP device 210 to send the first response frame (e.g., the first SCS response frame) to the STA device 220, for indicating whether the AP device 210 accepts the request on the first stream such as the SCS stream #1, and more particularly, indicating whether the AP device 210 accepts or declines the request on the first indication indicating that the STA device 220 disagrees on sharing the same TID with the aforementioned any other stream (e.g., the additional request that the SCS stream #1 and the aforementioned any other stream such as the SCS stream #2 and the non-SCS stream being not assigned to the same TID), while the first response frame may indicate that the AP device 210 accepts the request on the SCS stream #1; but the present invention is not limited thereto. As shown in the left half of FIG. 3, the first response frame (e.g., the first SCS response frame) can be prepared in the TX buffer 214T for being sent to the STA device 220 (labeled "Prepared SCS response frame to be sent to STA" for brevity), and the preference-related response information corresponding to the preference information, such as the response information for indicating whether the AP device 210 accepts or declines/rejects the first stream (e.g., the SCS stream #1) and the aforementioned at least one other stream (e.g., the SCS stream #2 and the non-SCS stream) being not assigned to the same TID, can be embedded in the first response frame (e.g., the first SCS response frame), for example, at a predetermined location within the first response frame (e.g., the first SCS response frame). As a result, when sending the first response frame (e.g., the first SCS response frame) to the STA device 220, the AP device 210 can notify the STA device 220 of the determining result indicated by the preference-related response information.

According to some embodiments, the first response frame is able to decline to the request on the first indication indicating that the STA device 220 disagrees on sharing the same TID with the aforementioned any other stream, while the first response frame indicates that the AP device 210 accepts the request on the SCS stream #1. More particularly, the first indication embedded in the first request frame may indicate that the STA device 220 disagrees that the SCS stream #1 and the aforementioned any other stream (e.g., the SCS stream #2 and the non-SCS stream) from the AP device 210 to the STA device 220 share the same TID, and in a situation where the first response frame indicates that the AP device 210 accepts the request on the first stream such as the SCS stream #1, the first response frame may indicate, by using the preference-related response information therein, that the AP device 210 declines the request regarding the preference of not sharing the same TID, such as the request on the first indication indicating that the STA device 220 disagrees on sharing the same TID with the aforementioned any other stream (e.g., the additional request that the SCS stream #1 and the aforementioned any other stream such as the SCS stream #2 and the non-SCS stream being not assigned to the same TID), but the present invention is not limited thereto.

For example, the first response frame may indicate that that the AP device 210 accepts the request on the SCS stream #1 and also accepts the request on the first indication indicating that the STA device 220 disagrees on sharing the same TID with the aforementioned any other stream. More particularly, the determining result indicated by the preference-related response information may represent a first determining result such as Yes, which may indicate that the AP device 210 accepts the request on the first indication indicating that the STA device 220 disagrees on sharing the same TID with the aforementioned any other stream. In this situation, the AP device 210 can map or assign the first stream such as the SCS stream #1 to a dedicated TID (e.g., 7) among the plurality of predetermined TIDs and prevent mapping or assigning the aforementioned any other stream (e.g., the SCS stream #2 and the non-SCS stream) to this dedicated TID (e.g., 7), to allow the STA device 220 to receive the data units of the first stream (e.g., the SCS stream #1) as soon as possible and process the received data units of the first stream (e.g., the SCS stream #1) efficiently, and therefore enhance the overall performance. For another example, the first response frame may indicate that that the AP device 210 accepts the request on the SCS stream #1 but declines or rejects the request on the first indication indicating that the STA device 220 disagrees on sharing the same TID with the aforementioned any other stream. More particularly, the determining result indicated by the preference-related response information may represent a second determining result such as No, which may indicate that the AP device 210 declines or rejects the request on the first indication indicating that the STA device 220 disagrees on sharing the same TID with the aforementioned any other stream. In this situation, the AP device 210 can map or assign the first stream such as the SCS stream #1 and the aforementioned any other stream (e.g., the SCS stream #2 and the non-SCS stream) to the same TID (e.g., 7) to save the associated resources (e.g., TIDs), where the plurality of predetermined TIDs may have been used up, and the AP device 210 may have no choice and therefore cannot accept this request indicated by the preference information such as the first indication from the STA device 220. For brevity, similar descriptions for these embodiments are not repeated in detail here.

Figure 4:
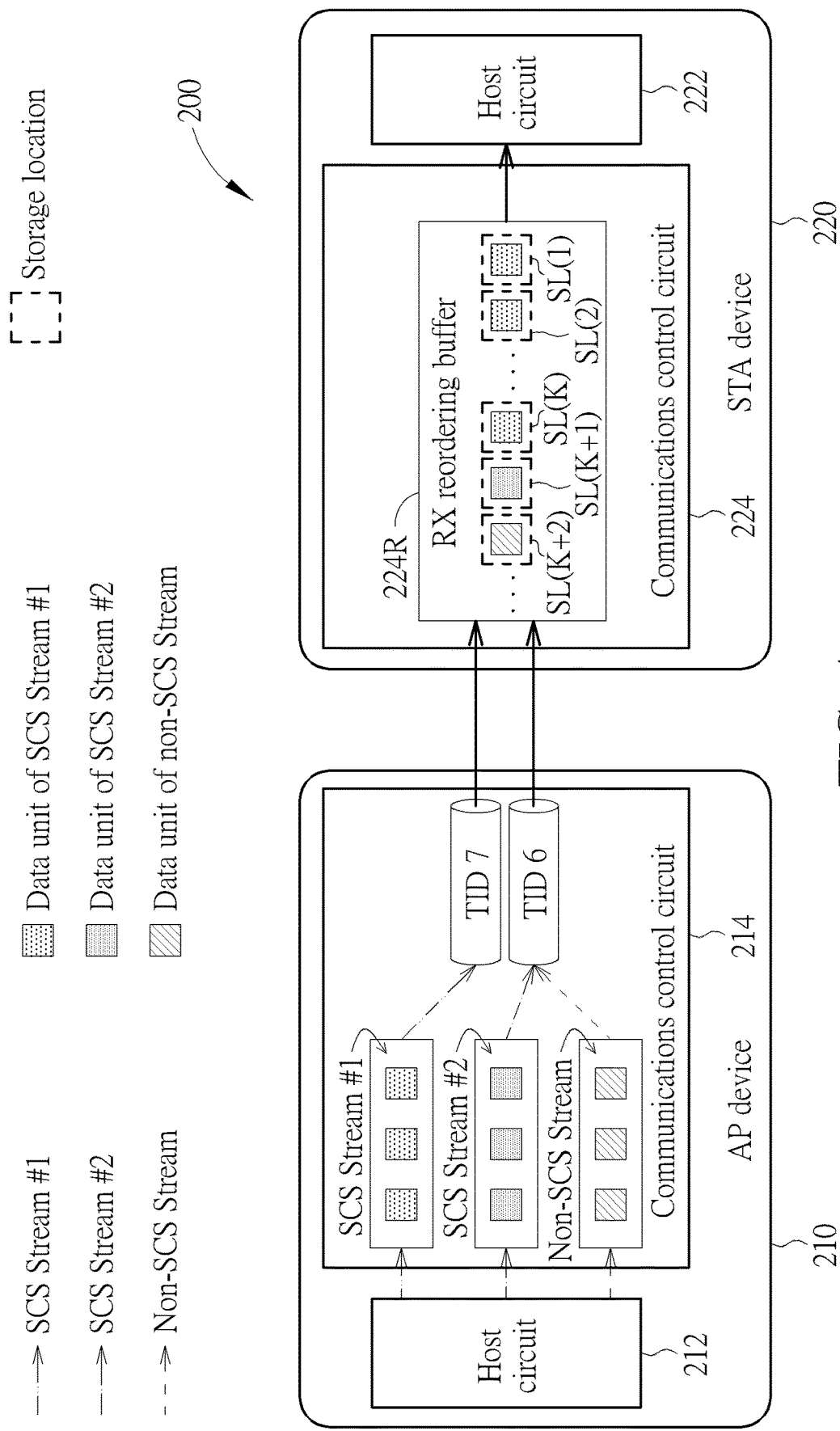
FIG. 4 is a diagram illustrating some implementation details of the preference-aware data processing control scheme shown in FIG. 3 according to an embodiment of the present invention.

FIG. 4 is a diagram illustrating some implementation details of the preference-aware data processing control scheme shown in FIG. 3 according to an embodiment of the present invention, where the determining result indicated by the preference-related response information may represent the first determining result such as Yes, which may indicate that the AP device 210 accepts the request on the first indication indicating that the STA device 220 disagrees on sharing the same TID with the aforementioned any other stream. In this situation, the AP device 210 can map or assign the first stream such as the SCS stream #1 to the dedicated TID among the plurality of predetermined TIDs, such as seven (labeled "TID 7" for brevity), and further map or assign the aforementioned any other stream (e.g., the SCS stream #2 and the non-SCS stream) to at least one other TID among the plurality of predetermined TIDs, such as six (labeled "TID 6" for brevity), to allow the STA device 220 to receive the data units of the first stream (e.g., the SCS stream #1) as soon as possible and process the received data units of the first stream (e.g., the SCS stream #1) efficiently, and therefore enhance the overall performance, but the present invention is not limited thereto. According to some embodiments, the aforementioned dedicated TID among the plurality of predetermined TIDs can be any TID among the plurality of predetermined TIDs, and more particularly, can be equal to any value selected from the values {0, 1, 2, 3, 4, 5, 6, 7}, and the aforementioned at least one other TID among the plurality of predetermined TIDs can be selected from other values among the values {0, 1, 2, 3, 4, 5, 6, 7}, and more particularly, can be at least one other value among the values {0, 1, 2, 3, 4, 5, 6, 7}.

For better comprehension, assume that the symbol "K" may represent a positive integer greater than one, and more particularly, may represent a predetermined data unit count for data transmission regarding the first stream such as the SCS stream #1, but the present invention is not limited thereto. For example, the received data units of the first stream (e.g., the SCS stream #1) may comprise K data units of the first stream (e.g., the SCS stream #1). As shown in the right half of FIG. 4, the K data units can be received and buffered at the first K storage locations {SL(1), SL(2), . . . , SL(K)} among the series of storage locations {SL(1), SL(2), SL(3), SL(4), SL(5), SL(6), . . . } mentioned above. As a result, the STA device 220 can process the K data units of the first stream (e.g., the SCS stream #1) efficiently and flush the K data units from the first K storage locations {SL(1), SL(2), . . . SL(K)} to the host circuit 222 in advance, for further processing by the host circuit 222, and therefore enhance the overall performance. For brevity, similar descriptions for this embodiment are not repeated in detail here.

In the embodiment shown in FIG. 4, one or more data units of the aforementioned any other stream (e.g., the SCS stream #2 and the non-SCS stream) may be received and buffered at one or more subsequent storage locations among the series of storage locations {SL(1), SL(2), SL(3), SL(4), SL(5), SL(6), . . . }, where the one or more data units of the aforementioned at least one other stream may be illustrated as a data unit of the SCS stream #2 and a data unit of the non-SCS stream that are received and buffered at the first two subsequent storage locations SL(K+1) and SL(K+2), respectively, but the present invention is not limited thereto. According to some embodiments, in a situation where the number of data units of the first stream (e.g., the SCS stream #1) is greater than K, the AP device 210 can send all of the data units of the first stream (e.g., the SCS stream #1) to the STA device 220 first, and prevent sending any data unit of the aforementioned any other stream (e.g., the SCS stream #2 and the non-SCS stream) before completion of sending all of the data units of the first stream (e.g., the SCS stream #1) to the STA device 220. For example, the data units buffered at the storage locations SL(K+1) and SL(K+2) may be illustrated as data units of the first stream (e.g., the SCS stream #1) to indicate that the STA device 220 can process the first stream (e.g., the SCS stream #1) first. As a result, the STA device 220 can process all of the data units of the first stream (e.g., the SCS stream #1) efficiently and flush the data units from the storage locations {SL(1), SL(2), . . . , SL(K), SL(K+1), SL(K+2), . . . } to the host circuit 222 in advance, for further processing by the host circuit 222, and therefore enhance the overall performance. For brevity, similar descriptions for these embodiments are not repeated in detail here.

According to some embodiments, during the SCS negotiation regarding a certain stream among multiple streams (e.g., the first stream and the aforementioned at least one other stream) from the AP device 210 to the STA device 220, such as the SCS negotiation regarding a target SCS stream among multiple SCS streams (e.g., the SCS stream #1 and the SCS stream #2) from the AP device 210 to the STA device 220, the STA device 220 can send an SCS request frame regarding the target SCS stream to the AP device 210. The SCS request frame regarding the target SCS stream may carry an SCS descriptor element, for indicating at least one request (e.g., one or more requests) regarding the target SCS stream, and the SCS descriptor element may comprise an SCS identifier (SCSID), a request type and one or more other elements such as optional elements and sub-elements (or subelements). In addition, the aforementioned at least one request regarding the target SCS stream as indicated by the SCS descriptor element may comprise a QoS requirement or a classification rule sent from the STA device 220, and the AP device 210 can accept the aforementioned at least one request regarding the target SCS stream, and can generate the target SCS stream while considering the aforementioned at least one request regarding the target SCS stream as indicated by the SCS descriptor element. More particularly, the SCS request frame regarding the target SCS stream may comprise a preference indication acting as the preference information INFO_PREF, where the preference information INFO_PREF can be taken as an example of the preference information mentioned above. In response to the SCS request frame regarding the target SCS stream, the AP device 210 can send an SCS response frame regarding the target SCS stream.

For example, the SCS descriptor element carried by the SCS request frame regarding the target SCS stream may represent a first SCS descriptor element comprising a first SCSID SCSID_1, and the target SCS stream may represent the SCS stream #1 corresponding to the first SCSID SCSID_1. The first SCS descriptor element comprising the first SCSID SCSID_1 can be configured to indicate one or more requests (e.g., a QoS requirement and/or a classification rule sent from the STA device 220) regarding the SCS stream #1, to make the SCS stream #1 be generated considering the one or more requests regarding the SCS stream #1 at the AP side (e.g., the AP device). More particularly, the SCS request frame and the SCS response frame regarding the target SCS stream may represent the first SCS request frame and the first SCS response frame regarding the SCS stream #1 as described in the embodiment shown in FIG. 3, respectively, where the first SCS request frame regarding the SCS stream #1 may comprise the aforementioned first indication (e.g., a first preference indication acting as the preference information INFO_PREF(1) corresponding to the SCS stream #1) which may indicate whether the STA device 220 disagrees that the SCS stream #1 and the aforementioned any other stream (e.g., the SCS stream #2 and the non-SCS stream) from the AP device 210 to the STA device 220 share the same TID, but the present invention is not limited thereto. For another example, the SCS descriptor element carried by the SCS request frame regarding the target SCS stream may represent a second SCS descriptor element comprising a second SCSID SCSID_2, and the target SCS stream may represent the SCS stream #2 corresponding to the second SCSID SCSID_2. The second SCS descriptor element comprising the second SCSID SCSID_2 can be configured to indicate one or more requests (e.g., a QoS requirement and/or a classification rule sent from the STA device 220) regarding the SCS stream #2, to make the SCS stream #2 be generated considering the one or more requests regarding the SCS stream #2 at the AP side (e.g., the AP device). More particularly, the SCS request frame and the SCS response frame regarding the target SCS stream may represent a second SCS request frame and a second SCS response frame regarding the SCS stream #2, respectively, where the second SCS request frame regarding the SCS stream #2 may comprise a second indication (e.g., a second preference indication acting as the preference information INFO_PREF(2) corresponding to the SCS stream #2) which may indicate whether the STA device 220 disagrees that the SCS stream #2 and the other stream(s) (e.g., the SCS stream #1 and the non-SCS stream) from the AP device 210 to the STA device 220 share the same TID. For brevity, similar descriptions for these embodiments are not repeated in detail here.

Figure 5:
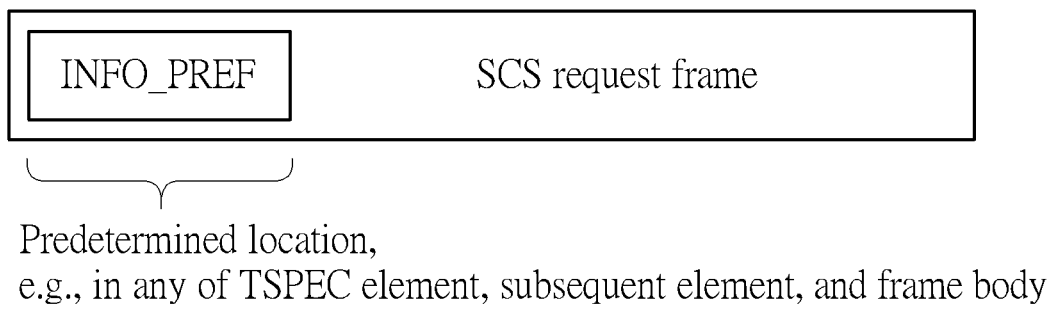
FIG. 5 is a diagram illustrating a preference information control scheme of the method according to an embodiment of the present invention.

FIG. 5 is a diagram illustrating a preference information control scheme of the method according to an embodiment of the present invention. The STA side (e.g., the STA device 220) can set the preference information INFO_PREF at a predetermined location within the SCS request frame regarding the target SCS stream. More particularly, the predetermined location may represent at least one field (e.g., one or more fields) within a predetermined portion of the SCS request frame regarding the target SCS stream. For example, the predetermined portion of the SCS request frame regarding the target SCS stream may represent a certain element such as a traffic specification (TSPEC) element, a subsequent element, etc. or a frame body within the SCS request frame regarding the target SCS stream, where the preference information INFO_PREF may be positioned in any of the TSPEC element, the subsequent element and the frame body within the SCS request frame regarding the target SCS stream, but the present invention is not limited thereto. For brevity, similar descriptions for this embodiment are not repeated in detail here.

According to some embodiments, the SCS descriptor element carried by the SCS request frame regarding the target SCS stream (e.g., the first descriptor element carried by the first SCS request frame regarding the SCS stream #1) may comprise one or more elements, and the one or more elements of this descriptor element (e.g., the first descriptor element) may comprise the TSPEC element, and more particularly, may comprise the subsequent element, where the preference indication acting as the preference information INFO_PREF (e.g., the first preference indication acting as the preference information INFO_PREF(1) corresponding to the SCS stream #1) may be embedded in the TSPEC element, but the present invention is not limited thereto. According to some embodiments, the SCS descriptor element carried by the SCS request frame regarding the target SCS stream (e.g., the first descriptor element carried by the first SCS request frame regarding the SCS stream #1) may comprise one or more optional elements, and the one or more optional elements of this descriptor element (e.g., the first descriptor element) may comprise an optional element (e.g., the subsequent element mentioned above) among the one or more optional elements, such as an element that differs from the TSPEC element, where the preference indication acting as the preference information INFO_PREF (e.g., the first preference indication acting as the preference information INFO_PREF(1) corresponding to the SCS stream #1) may be embedded in this optional element such as the subsequent element. For brevity, similar descriptions for these embodiments are not repeated in detail here.

FIG. 6 is a diagram illustrating the predetermined location involved with the preference information control scheme shown in FIG. 5 according to an embodiment of the present invention, where the symbol " . . . " shown in FIG. 6 may represent some optional fields, but the present invention is not limited thereto. The SCS descriptor element carried by the SCS request frame regarding the target SCS stream (e.g., the first descriptor element carried by the first SCS request frame regarding the SCS stream #1) may comprise multiple fields in a predetermined SCS descriptor element format (e.g., the SCS descriptor element format shown in FIG. 6), and any field among the multiple fields in the predetermined SCS descriptor element format may comprise one or more octets (e.g. one or more bytes).

For example, in the predetermined SCS descriptor element format of the SCS descriptor element carried by the SCS request frame regarding the target SCS stream, such as the SCS descriptor element format shown in FIG. 6, the first four fields and a subsequent field may be arranged to store an element identifier (ID) of this SCS descriptor element, a length of this SCS descriptor element, the SCSID for identifying the target SCS stream, the request type of this SCS descriptor element, and the TSPEC element for defining one or more requests from the STA device 220 regarding the target SCS stream, respectively (labeled "Element ID", "Length", "SCSID", "Request type" and "TSPEC element" for brevity, respectively), where each field among the first four fields may comprise a single octet such as a single byte (labeled "1" for brevity), and the subsequent field may comprise fifty-seven octets such as fifty-seven bytes (labeled "57" for brevity). As there may be optional elements/subelements coming after the TSPEC element, the length of the optional elements/subelements may be regarded as a variable octet count (labeled "variable" for brevity), depending on various ways of the implementation of this SCS descriptor element, but the present invention is not limited thereto. In addition, the preference indication acting as the preference information INFO_PREF (e.g., the first preference indication acting as the preference information INFO_PREF(1) corresponding to the SCS stream #1) may be positioned in the TSPEC element mentioned in the embodiment shown in FIG. 5, such as the TSPEC element in the SCS descriptor element format shown in FIG. 6, and the predetermined location may represent at least one sub-field (e.g., one or more sub-fields) within the TSPEC element as shown in FIG. 6. For brevity, similar descriptions for this embodiment are not repeated in detail here.

FIG. 7 is a diagram illustrating the predetermined location involved with the preference information control scheme shown in FIG. 5 according to another embodiment of the present invention, where the symbol " . . . " shown in FIG. 7 may represent some optional fields, but the present invention is not limited thereto. The SCS descriptor element carried by the SCS request frame regarding the target SCS stream (e.g., the first descriptor element carried by the first SCS request frame regarding the SCS stream #1) may comprise the multiple fields in the predetermined SCS descriptor element format (e.g., the SCS descriptor element format shown in FIG. 7), and any field among the multiple fields in the predetermined SCS descriptor element format may comprise one or more octets (e.g. one or more bytes).

For example, in the predetermined SCS descriptor element format of the SCS descriptor element carried by the SCS request frame regarding the target SCS stream, such as the SCS descriptor element format shown in FIG. 7, the first four fields may be arranged to store the element ID of this SCS descriptor element, the length of this SCS descriptor element, the SCSID for identifying the target SCS stream, and the request type of this SCS descriptor element, respectively (labeled "Element ID", "Length", "SCSID" and "Request type" for brevity, respectively), and the aforementioned subsequent field for storing the TSPEC element may become optional in this embodiment, where each field among the first four fields may comprise a single octet such as a single byte (labeled "1" for brevity), and the subsequent field may comprise zero or fifty-seven octets such as zero or fifty-seven bytes (labeled "0 or 57" for brevity), depending on whether this subsequent field is omitted or kept, but the present invention is not limited thereto. In addition, the preference indication acting as the preference information INFO_PREF (e.g., the first preference indication acting as the preference information INFO_PREF(1) corresponding to the SCS stream #1) may be positioned in the subsequent element mentioned in the embodiment shown in FIG. 5, such as a predetermined subsequent element among at least one subsequent element (e.g., one or more subsequent elements) in the SCS descriptor element format shown in FIG. 7, and the predetermined location may represent at least one sub-field (e.g., one or more sub-fields) within the subsequent element mentioned in the embodiment shown in FIG. 5, such as at least one sub-field within the predetermined subsequent element among the aforementioned at least one subsequent element. As there may be one or more subsequent elements among the aforementioned at least one subsequent element in the SCS descriptor element format shown in FIG. 7, the length of the aforementioned at least one subsequent element may be regarded as a variable octet count (labeled "variable" for brevity), depending on various ways of the implementation of this SCS descriptor element. For brevity, similar descriptions for this embodiment are not repeated in detail here.

According to some embodiments, the SCS request frame regarding the target SCS stream (e.g., the first SCS request frame regarding the SCS stream #1) may comprise the frame body, and the preference indication acting as the preference information INFO_PREF (e.g., the first preference indication acting as the preference information INFO_PREF(1) corresponding to the SCS stream #1) may be embedded in the frame body. For brevity, similar descriptions for these embodiments are not repeated in detail here.

Figure 8:
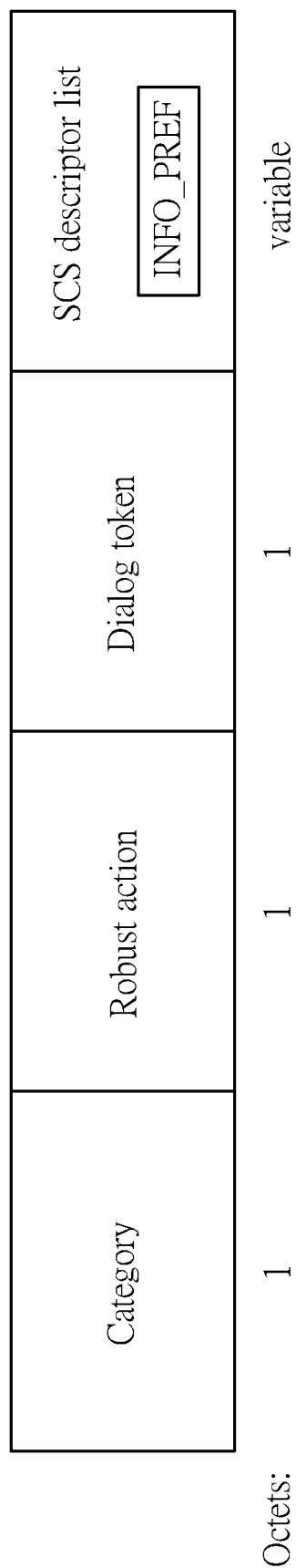
FIG. 8 is a diagram illustrating the predetermined location involved with the preference information control scheme shown in FIG. 5 according to yet another embodiment of the present invention.

FIG. 8 is a diagram illustrating the predetermined location involved with the preference information control scheme shown in FIG. 5 according to yet another embodiment of the present invention, where at least one portion (e.g., a portion or all) of the architecture shown in FIG. 8 can be taken as an example of the frame body mentioned above, but the present invention is not limited thereto.

For example, in a predetermined SCS request frame action field format of an action field within the SCS request frame regarding the target SCS stream (e.g., the first SCS request frame regarding the SCS stream #1), such as the SCS request frame action field format shown in FIG. 8, the first three fields may be arranged to store category information of this SCS request frame, robust action information of this SCS request frame, and dialog token information of this SCS request frame, respectively (labeled "Category", "Robust action" and "Dialog token" for brevity, respectively), and at least one remaining field (e.g. one or more remaining fields) may be arranged to store a predetermined SCS descriptor list comprising at least one predetermined SCS descriptor element (e.g. one or more predetermined SCS descriptor elements), where each field among the first three fields may comprise a single octet such as a single byte (labeled "1" for brevity), but the present invention is not limited thereto. In addition, the preference indication acting as the preference information INFO_PREF (e.g., the first preference indication acting as the preference information INFO_PREF(1) corresponding to the SCS stream #1) may be positioned in the frame body mentioned in the embodiment shown in FIG. 5, such as the aforementioned at least one remaining field in the SCS request frame action field format shown in FIG. 8, and the predetermined location may represent at least one sub-field (e.g., one or more sub-fields) within the aforementioned at least one remaining field. As there may be one or more predetermined SCS descriptor elements within the predetermined SCS descriptor list in the SCS request frame action field format shown in FIG. 8, the length of the predetermined SCS descriptor list may be regarded as a variable octet count (labeled "variable" for brevity), depending on various ways of the implementation of this SCS request frame. For brevity, similar descriptions for this embodiment are not repeated in detail here.

According to some embodiments, the preference indication acting as the preference information INFO_PREF (e.g., the first preference indication acting as the preference information INFO_PREF(1) corresponding to the SCS stream #1) may be positioned in the frame body mentioned in the embodiment shown in FIG. 5, such as an additional field coming after the aforementioned at least one remaining field in the SCS request frame action field format shown in FIG. 8. For brevity, similar descriptions for these embodiments are not repeated in detail here.

Figure 9:
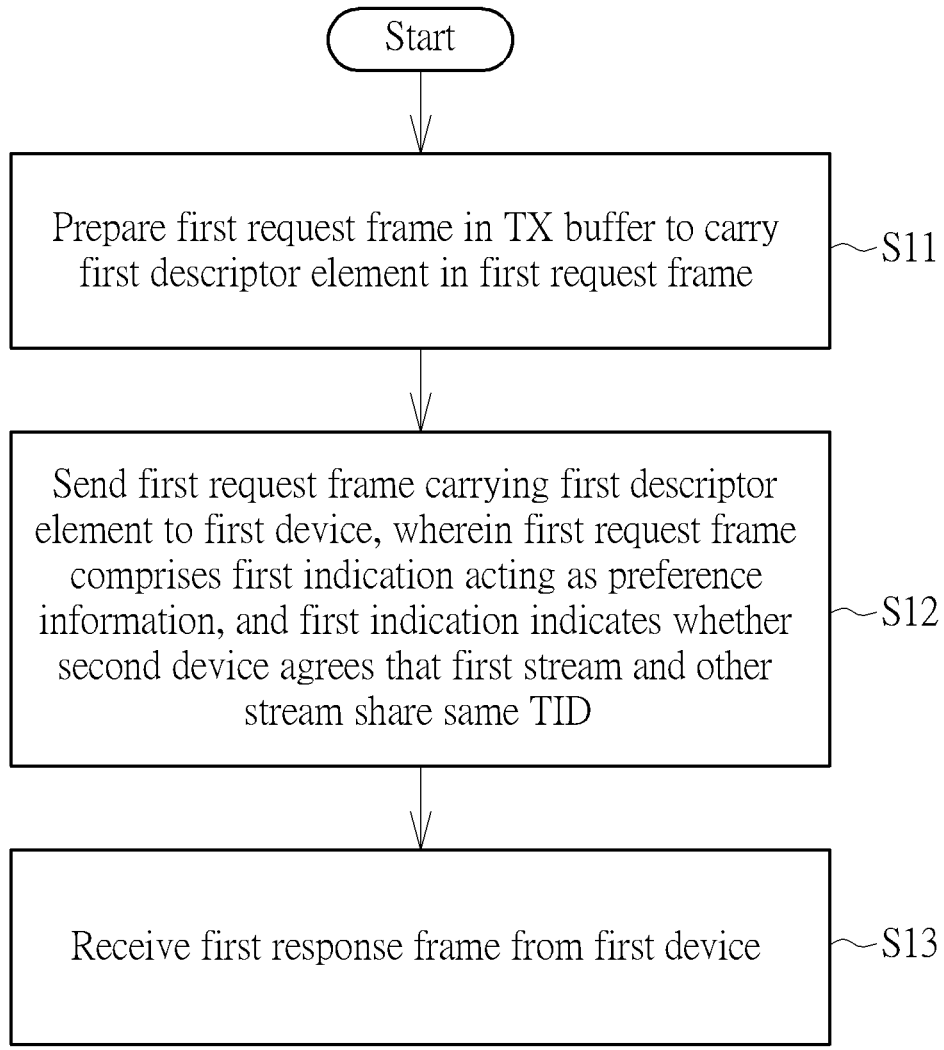
FIG. 9 illustrates a working flow of the method according to an embodiment of the present invention.

FIG. 9 illustrates a working flow of the method of traffic flow management in the wireless communications system with the SCS according to an embodiment of the present invention, where the method is applicable to the second device (e.g., the STA device 120 such as the STA device 220) that is wirelessly connected to the first device (e.g., the AP device 110 such as the AP device 210).

In Step S11, the wireless communications system 200 can utilize the STA device 220 to prepare the first request frame (e.g., the first SCS request frame) in the TX buffer 214T to carry the first descriptor element (e.g., the first SCS descriptor element) in the first request frame (e.g., the first SCS request frame), for requesting for the first stream such as the SCS stream #1 from the AP device 210 to the STA device 220, wherein the first descriptor element is related to the SCS.

In Step S12, the wireless communications system 200 can utilize the STA device 220 to send the first request frame carrying the first descriptor element (e.g., the first SCS request frame carrying the first SCS descriptor element) to the first device such as the AP device 210, wherein the first request frame (e.g., the first SCS request frame) may comprise the first indication acting as the preference information INFO_PREF (e.g., the first preference indication acting as the preference information INFO_PREF(1) corresponding to the SCS stream #1), and the first indication may indicate whether the second device such as the STA device 220 agrees that the first stream such as the SCS stream #1 and the aforementioned any other stream (e.g., the SCS stream #2 and the non-SCS stream) from the AP device 210 to the STA device 220 share the same TID.

In Step S13, the wireless communications system 200 can utilize the STA device 220 to receive the first response frame (e.g., the first SCS response frame) from the first device such as the AP device 210, and more particularly, receive the first response frame (e.g., the first SCS response frame) sent by the AP device 210 in response to the first request frame (e.g., the first SCS request frame), for indicating whether the AP device 210 accepts the request on the SCS stream #1. More particularly, the first response frame may indicate whether the AP device 210 accepts the aforementioned at least one request regarding the first stream (e.g., the SCS stream #1), and more particularly, indicate whether the AP device 210 accepts or declines/rejects the additional request indicated by the preference information INFO_PREF (e.g., the first preference indication acting as the preference information INFO_PREF(1) corresponding to the SCS stream #1), such as the request that the SCS stream #1 and the aforementioned any other stream (e.g., the SCS stream #2 and the non-SCS stream) are not assigned to the same TID.

For example, the first indication (e.g., the first preference indication acting as the preference information INFO_PREF (1) corresponding to the SCS stream #1) embedded in the first request frame may indicate that the STA device 220 disagrees that the SCS stream #1 and the aforementioned any other stream (e.g., the SCS stream #2 and the non-SCS stream) from the AP device 210 to the STA device 220 share the same TID. In addition, the first response frame may indicate whether the AP device 210 accepts the request on the first indication indicating that the STA device 220 disagrees on sharing the same TID with the aforementioned any other stream, and more particularly, may indicate whether the AP device 210 accepts or declines/rejects the additional request indicated by the preference information INFO_PREF (e.g., the first preference indication acting as the preference information INFO_PREF(1) corresponding to the SCS stream #1), such as the request that the SCS stream #1 and the aforementioned any other stream (e.g., the SCS stream #2 and the non-SCS stream) are not assigned to the same TID. For brevity, similar descriptions for this embodiment are not repeated in detail here.

For better comprehension, the method may be illustrated with the working flow shown in FIG. 9, but the present invention is not limited thereto. According to some embodiments, one or more steps may be added, deleted, or changed in the working flow shown in FIG. 9.

In the embodiment shown in FIG. 9, the operations of Steps S11, S12 and S13 may be illustrated for the case that the target SCS stream represents the SCS stream #1 corresponding to the first SCSID SCSID_1 as described above, where the first SCS request frame regarding the SCS stream #1, the first SCS descriptor element therein configured for indicating the one or more requests (e.g., the QoS requirement and/or the classification rule sent from the STA device 220) regarding the SCS stream #1, the first preference indication acting as the preference information INFO_PREF (1) corresponding to the SCS stream #1 for indicating the additional request regarding the SCS stream #1, and the first SCS response frame regarding the SCS stream #1 can be taken as examples of the SCS request frame regarding the target SCS stream, the SCS descriptor element therein configured for indicating the aforementioned at least one request regarding the target SCS stream, the preference indication acting as the preference information INFO_PREF for indicating the additional request regarding the target SCS stream, and the SCS response frame regarding the target SCS stream, respectively, but the present invention is not limited thereto. According to some embodiments, the operations of Steps S11, S12 and S13 may be illustrated for the case that the target SCS stream represents the SCS stream #2 corresponding to the first SCSID SCSID_2, where the second SCS request frame regarding the SCS stream #2, the second SCS descriptor element therein configured for indicating the one or more requests (e.g., the QoS requirement and/or the classification rule sent from the STA device 220) regarding the SCS stream #2, the second preference indication acting as the preference information INFO_PREF(2) corresponding to the SCS stream #2 for indicating the additional request regarding the SCS stream #2, and the second SCS response frame regarding the SCS stream #2 can be taken as examples of the SCS request frame regarding the target SCS stream, the SCS descriptor element therein configured for indicating the aforementioned at least one request regarding the target SCS stream, the preference indication acting as the preference information INFO_PREF for indicating the additional request regarding the target SCS stream, and the SCS response frame regarding the target SCS stream, respectively. For brevity, similar descriptions for these embodiments are not repeated in detail here.

Figure 10:
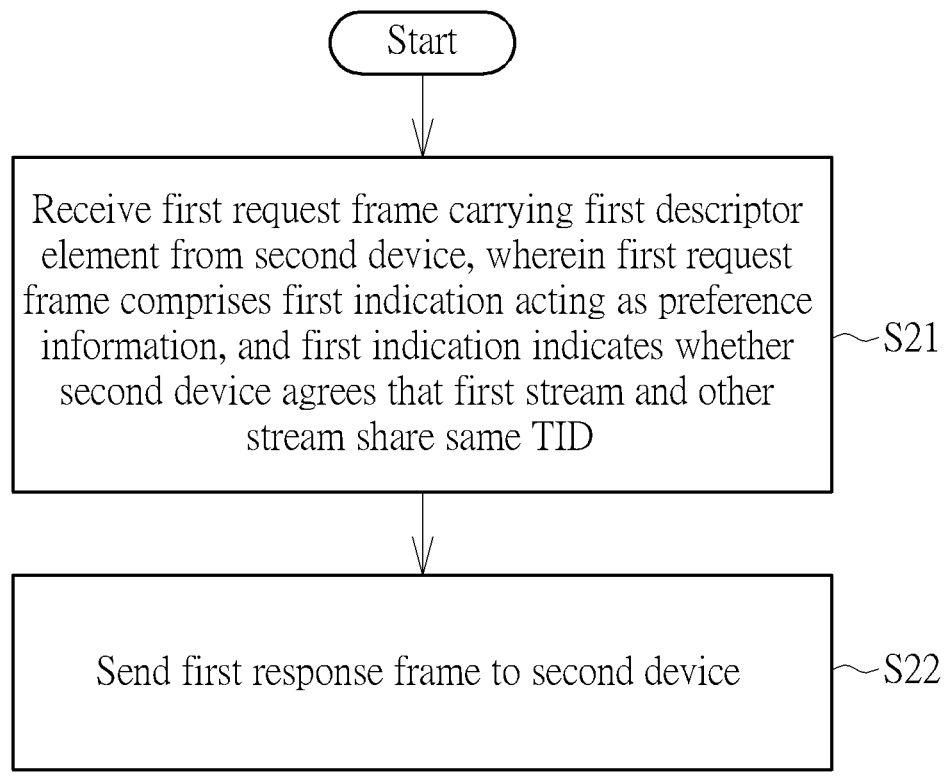
FIG. 10 illustrates a working flow of the method according to another embodiment of the present invention.

FIG. 10 illustrates a working flow of the method of traffic flow management in the wireless communications system with the SCS according to another embodiment of the present invention, where the method is applicable to the first device (e.g., the AP device 110 such as the AP device 210) that is wirelessly connected to the second device (e.g., the STA device 120 such as the STA device 220).

In Step S21, the wireless communications system 200 can utilize the AP device 210 to receive the first request frame carrying the first descriptor element (e.g., the first SCS request frame carrying the first SCS descriptor element) from the second device such as the STA device 220, for example, the first descriptor element (e.g., the first SCS descriptor element) is carried in the first request frame (e.g., the first SCS request frame) for requesting for the first stream such as the SCS stream #1 from the AP device 210 to the STA device 220, and is related to the SCS, wherein the first request frame (e.g., the first SCS request frame) may comprise the first indication acting as the preference information INFO_PREF (e.g., the first preference indication acting as the preference information INFO_PREF(1) corresponding to the SCS stream #1), and the first indication may indicate whether the second device such as the STA device 220 agrees that the first stream such as the SCS stream #1 and the aforementioned any other stream (e.g., the SCS stream #2 and the non-SCS stream) from the AP device 210 to the STA device 220 share the same TID.

In Step S22, in response to the first request frame (e.g., the first SCS request frame), the wireless communications system 200 can utilize the AP device 210 to send the first response frame (e.g., the first SCS response frame) to the second device such as the STA device 220, for indicating whether the AP device 210 accepts the request on the SCS stream #1, and more particularly, indicating whether the AP device 210 accepts or declines/rejects the additional request indicated by the preference information INFO_PREF (e.g., the first preference indication acting as the preference information INFO_PREF(1) corresponding to the SCS stream #1), such as the request that the SCS stream #1 and the aforementioned any other stream (e.g., the SCS stream #2 and the non-SCS stream) are not assigned to the same TID.

For example, in a situation where the first indication (e.g., the first preference indication acting as the preference information INFO_PREF(1) corresponding to the SCS stream #1) embedded in the first request frame indicates that the STA device 220 disagrees that the SCS stream #1 and the aforementioned any other stream (e.g., the SCS stream #2 and the non-SCS stream) from the AP device 210 to the STA device 220 share the same TID, the first response frame may indicate whether the AP device 210 accepts or declines/rejects the request on the first indication indicating that the STA device 220 disagrees on sharing the same TID with the aforementioned any other stream, and more particularly, may indicate whether the AP device 210 accepts or declines/rejects the additional request indicated by the preference information INFO_PREF (e.g., the first preference indication acting as the preference information INFO_PREF(1) corresponding to the SCS stream #1), such as the request that the SCS stream #1 and the aforementioned any other stream (e.g., the SCS stream #2 and the non-SCS stream) are not assigned to the same TID. For brevity, similar descriptions for this embodiment are not repeated in detail here.

For better comprehension, the method may be illustrated with the working flow shown in FIG. 10, but the present invention is not limited thereto. According to some embodiments, one or more steps may be added, deleted, or changed in the working flow shown in FIG. 10.

In the embodiment shown in FIG. 10, the operations of Steps S21 and S22 may be illustrated for the case that the target SCS stream represents the SCS stream #1 corresponding to the first SCSID SCSID_1 as described above, where the first SCS request frame regarding the SCS stream #1, the first SCS descriptor element therein configured for indicating the one or more requests (e.g., the QoS requirement and/or the classification rule sent from the STA device 220) regarding the SCS stream #1, the first preference indication acting as the preference information INFO_PREF(1) corresponding to the SCS stream #1 for indicating the additional request regarding the SCS stream #1, and the first SCS response frame regarding the SCS stream #1 can be taken as examples of the SCS request frame regarding the target SCS stream, the SCS descriptor element therein configured for indicating the aforementioned at least one request regarding the target SCS stream, the preference indication acting as the preference information INFO_PREF for indicating the additional request regarding the target SCS stream, and the SCS response frame regarding the target SCS stream, respectively, but the present invention is not limited thereto. According to some embodiments, the operations of Steps S21 and S22 may be illustrated for the case that the target SCS stream represents the SCS stream #2 corresponding to the first SCSID SCSID_2, where the second SCS request frame regarding the SCS stream #2, the second SCS descriptor element therein configured for indicating the one or more requests (e.g., the QoS requirement and/or the classification rule sent from the STA device 220) regarding the SCS stream #2, the second preference indication acting as the preference information INFO_PREF(2) corresponding to the SCS stream #2 for indicating the additional request regarding the SCS stream #2, and the second SCS response frame regarding the SCS stream #2 can be taken as examples of the SCS request frame regarding the target SCS stream, the SCS descriptor element therein configured for indicating the aforementioned at least one request regarding the target SCS stream, the preference indication acting as the preference information INFO_PREF for indicating the additional request regarding the target SCS stream, and the SCS response frame regarding the target SCS stream, respectively. For brevity, similar descriptions for these embodiments are not repeated in detail here.

According to some embodiments, when the STA device 220 initializes the target SCS stream (e.g., the SCS stream #1) with the AP device 210, the STA device 220 can request to associate or assign the target SCS identified by a certain SCSID (e.g., the SCS stream #1 identified by the first SCSID SCSID_1) to a certain TID or user priority (UP). For example, there may be many downlink (DL) traffic flows between the AP device 210 and the STA device 220, it is possible that the AP device 210 will need to map or assign other traffic flows to the same TID as the SCS stream because the packet may be marked with a Differentiated Services Code Point (DSCP) which naturally maps to the same traffic category, such as access category (AC) video (AC_VO) or AC voice (AC_VI). In addition, some traffic flows with different characteristics (e.g. latency and/or jitter) may be mapped or assigned to the same TID as the SCS stream, so that these traffic flows may be buffered in the same queue at the receiver of the receiving side. For better comprehension, assume that the preference-related functions corresponding to some control schemes (e.g., the preference-aware data processing control scheme shown in FIG. 3 and the preference information control scheme shown in FIG. 5) of the method in the wireless communications system 100 (e.g., the AP device 210 and the STA device 220) can be temporarily disabled, but the present invention is not limited thereto. In a situation where the preference-related functions are temporarily disabled, the receiving side such as the STA device 220 may not be able to selectively process packets from the RX reordering buffer 224R, resulting in priority degradation and performance loss of the SCS stream. Based on these control schemes (e.g., the preference-aware data processing control scheme shown in FIG. 3 and the preference information control scheme shown in FIG. 5) of the method, the STA device 220 can indicate during the SCS setup to the AP device 210 whether traffic flows not belonging to that SCS stream can be mixed using the same TID or not. Therefore, the method of the present invention can guarantee that the receiving STA such as the STA device 220 can process a data unit (e.g., MSDU), such as a part of an SCS stream with certain requirements (e.g., QoS requirements), with corresponding receiving policies, to enhance the overall performance. For brevity, similar descriptions for these embodiments are not repeated in detail here.

According to some embodiments, the preference indication acting as the preference information INFO_PREF may comprise a first bit indication, and the first bit indication may comprise a bit such as a single bit, configured to indicate whether the STA device 220 agrees that the SCS stream #1 and the aforementioned any other stream (e.g., the SCS stream #2 and the non-SCS stream) from the AP device 210 to the STA device 220 share the same TID. More particularly, the preference indication acting as the preference information INFO_PREF may further comprise a second bit indication, and the second bit indication may comprise multiple bits, configured to indicate a level (e.g., a willingness level) to share among different SCSIDs, if the first bit indication indicates that the second device agrees the SCS stream #1 and the aforementioned any other stream (e.g., the SCS stream #2 and the non-SCS stream) share the same TID. For brevity, similar descriptions for these embodiments are not repeated in detail here.

According to some embodiments, the STA device 220 can utilize the first bit indication such as the single bit to notify the AP device 210 of whether the target SCS stream identified by a certain SCSID (e.g., the SCS stream #1 identified by the first SCSID SCSID_1) can or cannot share the TID with other streams such as other traffic flows (e.g., non-SCS traffic flows). For example, if the target SCS stream identified by a certain SCSID (e.g., the SCS stream #1 identified by the first SCSID SCSID_1) can share the TID, the STA device 220 can utilize the second bit indication such as the multiple bits to notify the AP device 210 of the level such as the willingness level to share the TID among different SCSIDs, where the level such as the willingness level can be further indicated by the second bit indication such as the multiple bits. In addition, the AP device 210 can decide which SCSID to share accordingly. For better comprehension, the bit count of the multiple bits of the second bit indication can be equal to two, and the second bit indication can be regarded as a two-bit indication, for example, a target two-bit indication selected from multiple predetermined two-bit indications such as the predetermined two-bit indication 3 (e.g., the two-bit binary value 11), the predetermined two-bit indication 2 (e.g., the two-bit binary value 10), the predetermined two-bit indication 1 (e.g., the two-bit binary value 01) and the predetermined two-bit indication 0 (e.g., the two-bit binary value 00), where the predetermined two-bit indication 3 means very willing to share the TID, the predetermined two-bit indication 0 means least willing to share the TID, and the predetermined two-bit indications 2 and 1 are intermediate willingness levels between the predetermined two-bit indications 3 and 0, but the present invention is not limited thereto. Additionally, the second bit indication such as the two-bit indication can be carried after the first bit indication at the predetermined location within the SCS request frame regarding the target SCS stream, but the present invention is not limited thereto. For example, the first bit indication and/or the second bit indication can be carried along with the TID or UP indicated in some element(s), such as a traffic classification (TCLAS) element and/or the TSPEC element as defined in the one or more versions of the IEEE 802.11 standards. Regarding the response at the AP side, the AP device 210 may accept the SCS request indicated by the SCS descriptor element in the SCS request frame (e.g., the first SCS descriptor element in the first SCS request frame regarding the SCS stream #1) but declines or rejects the additional request regarding the target SCS stream, such as the request of no TID sharing with other non-SCS flows. The AP device 210 can respond that the AP device 210 has to map or assign a non-SCS flow (if any comes later) to the TID associated with an SCS flow when all TIDs (e.g., the TIDs for AC_VO and AC_VI) are mapped with at least one SCSID and all SCSIDs do not share TID with other non-SCS flows. For brevity, similar descriptions for these embodiments are not repeated in detail here.

TABLE 1

| Element ID | Length | Element ID Extension | TID sharing with other non-SCS streams | Sharing policy | Padding (or reserved) |
|---|---|---|---|---|---|
| 1 byte | 1 byte | 1 byte | 1 bit | 2 bit | 5 bit |

Table 1 illustrates an example of an SCS descriptor element format of the SCS descriptor element in the SCS request frame regarding the target SCS stream, where the first bit indication such as the single bit and the second bit indication such as the multiple bits can be carried in the fields "TID sharing with other non-SCS streams" and "Sharing policy" in the SCS descriptor element format shown above, respectively, but the present invention is not limited thereto. For better comprehension, the fields "Element ID", "Length", and "Element ID Extension" in the SCS descriptor element format as shown in Table 1 can be arranged to carry the element ID of this SCS descriptor element, the length of this SCS descriptor element, and the SCSID for identifying the target SCS stream, respectively, and the field "Padding" can be arranged to carry padding information, but the present invention is not limited thereto. For example, the field "Padding" can be reserved for further use. For brevity, similar descriptions for this embodiment are not repeated in detail here.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of traffic flow management in a wireless communications system with stream classification service (SCS), the wireless communications system comprising a first device and a second device, the method being applicable to the second device, the method comprising:
    carrying and sending a first descriptor element in a first request frame, requesting for a SCS stream from the first device, wherein the first descriptor element is related to the SCS,
    wherein the first request frame comprises a first indication, indicating whether the second device agrees that the SCS stream and any other stream from the first device to the second device share a same traffic identifier (TID).

2. The method of claim 1, wherein the first device is an access point (AP) device, and the second device is a station (STA) device.

3. The method of claim 1, further comprising:
    receiving a first response frame from the first device, in response to the first request frame, for indicating whether the first device accepts request on the SCS stream.

4. The method of claim 3, wherein the first response frame is able to decline to the request on the first indication indicating that the second device disagrees on sharing the same TID with the any other stream, while the first response frame indicates that the first device accepts the request on the SCS stream.

5. The method of claim 1, wherein the first descriptor element comprises a first SCS identifier (SCSID).

6. The method of claim 5, wherein the any other stream comprises one or a combination of at least one non-SCS stream and at least one other SCS stream with a SCSID other than the first SCSID.

7. The method of claim 5, wherein the first request frame comprises a quality of service (QoS) requirement or a classification rule sent from the second device.

8. The method of claim 1, wherein the first indication comprises a first bit indication comprising a bit, configured to indicate whether the second device agrees that the SCS stream and the any other stream share the same TID.

9. The method of claim 8, wherein the first indication further comprises a second bit indication comprising multiple bits, configured to indicate a level to share among different SCS identifiers (SCSIDs), if the first bit indication indicates that the second device agrees the SCS stream and the any other stream share the same TID.

10. The method of claim 1, wherein the first descriptor element comprises one or more elements comprising a traffic specification (TSPEC) element, and the first indication is embedded in the TSPEC element.

11. The method of claim 1, wherein the first descriptor element comprises one or more optional elements, and the first indication is embedded in an optional element among the one or more optional elements.

12. A second device, for performing traffic flow management in a wireless communications system with stream classification service (SCS), the wireless communications system comprising a first device and the second device, the second device comprising:
    a processing circuit, arranged to control operations of the second device; and
    at least one communications control circuit, coupled to the processing circuit, arranged to perform communications control, wherein the at least one communications control circuit is arranged to perform wireless communications operations with the first device for the second device;
    wherein:
        the second device is arranged to carry and send a first descriptor element in a first request frame, requesting for a SCS stream from the first device, wherein the first descriptor element is related to the SCS,
        wherein the first request frame comprises a first indication, indicating whether the second device agrees that the SCS stream and any other stream from the first device to the second device share a same traffic identifier (TID).

13. The second device of claim 12, wherein the first device is an access point (AP) device, and the second device is a station (STA) device.

14. The second device of claim 12, wherein the second device is arranged to receive a first response frame from the first device, in response to the first request frame, for indicating whether the first device accepts request on the SCS stream.

15. The second device of claim 14, wherein the first response frame is able to decline to the request on the first indication indicating that the second device disagrees on sharing the same TID with the any other stream, while the first response frame indicates that the first device accepts the request on the SCS stream.

16. The second device of claim 12, wherein the first descriptor element comprises a first SCS identifier (SCSID).

17. The second device of claim 16, wherein the any other stream comprises one or a combination of at least one non-SCS stream and at least one other SCS stream with a SCSID other than the first SCSID.

18. The second device of claim 16, wherein the first request frame comprises a quality of service (QoS) requirement or a classification rule sent from the second device.

19. The second device of claim 12, wherein the first indication comprises a first bit indication comprising a bit, configured to indicate whether the second device agrees that the SCS stream and the any other stream share the same TID.

20. The second device of claim 19, wherein the first indication further comprises a second bit indication comprising multiple bits, configured to indicate a level to share among different SCS identifiers (SCSIDs), if the first bit indication indicates that the second device agrees the SCS stream and the any other stream share the same TID.

21. The second device of claim 12, wherein the first descriptor element comprises one or more elements comprising a traffic specification (TSPEC) element, and the first indication is embedded in the TSPEC element.

22. The second device of claim 12, wherein the first descriptor element comprises one or more optional elements, and the first indication is embedded in an optional element among the one or more optional elements.

23. A method of traffic flow management in a wireless communications system with stream classification service (SCS), the wireless communications system comprising a first device and a second device, the method being applicable to the first device, the method comprising:
receiving a first request frame carrying a first descriptor element from the second device, the first descriptor element requesting for a SCS stream from the first device, wherein the first descriptor element is related to the SCS, the first request frame comprises a first indication, indicating whether the second device agrees that the SCS stream and any other stream from the first device to the second device share a same traffic identifier (TID); and
in response to the first request frame, sending a first response frame to the second device, for indicating whether the first device accepts the request on the SCS stream.

24. The method of claim 23, wherein the first device is an access point (AP) device, and the second device is a station (STA) device.

25. The first device that operates according to the method of claim 23.

* * * * *